March 9, 1926.                                                              1,575,617
G. W. BULLEY
COMPOSITE HORN AND METHOD OF MAKING SAME
Filed Sept. 3, 1925
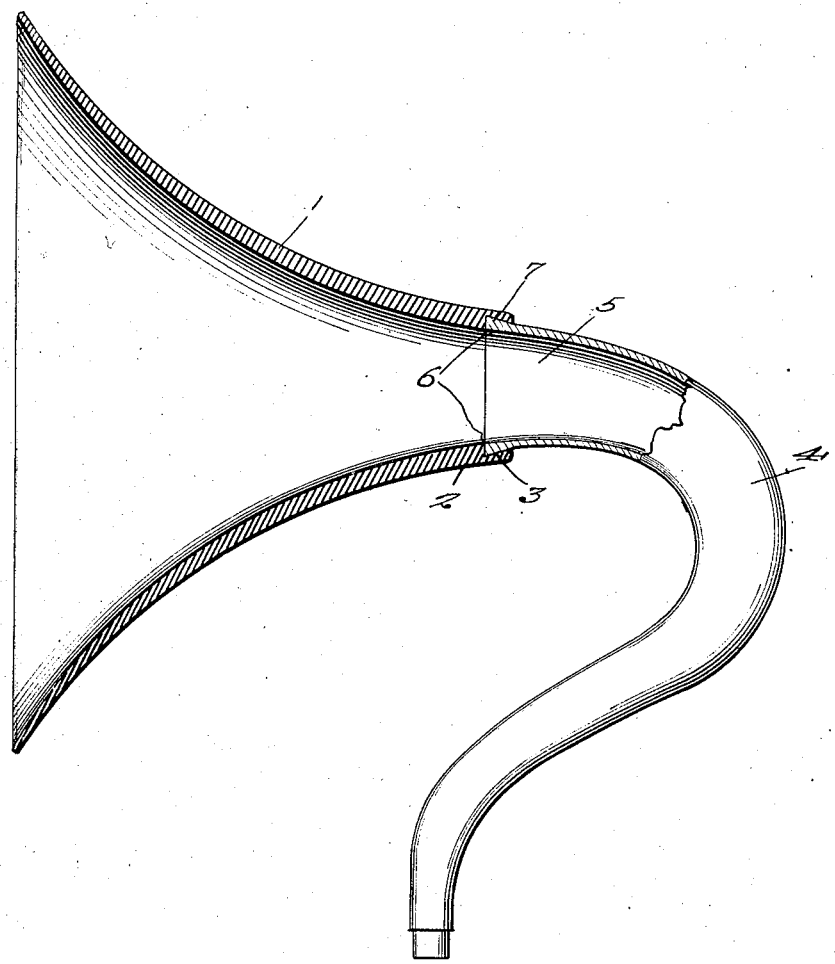
Inventor
George W. Bulley
By Spear, Middleton Donaldson, Hall
Attorney Patented Mar. 9, 1926.

1,575,617

UNITED STATES PATENT OFFICE.

GEORGE W. BULLEY, OF AKRON, OHIO, ASSIGNOR TO THE MILLER RUBBER COMPANY, OF AKRON, OHIO, A CORPORATION OF OHIO.

COMPOSITE HORN AND METHOD OF MAKING SAME.

Application filed September 3, 1925. Serial No. 54,301.

*To all whom it may concern:*

Be it known that I, GEORGE W. BULLEY, a citizen of the United States, and a resident of Akron, in the county of Summit and State of Ohio, have invented certain new and useful Improvements in Composite Horns and Methods of Making Same, of which the following is a specification.

My present invention relates to a method of assembling bell mouthed horns of the loud speaker type and in the article so assembled.

The principal object of my invention is to facilitate the quick and simple assembly of horns of the above type in which the bell mouth is of rubber or other plastic material and the goose neck of metal or the like.

To this end my invention contemplates forming a bell mouth horn in any desired manner of rubber or other plastic material which is soft or of a semi-soft nature when hot, with an interior rebate or groove around its smaller opening, and while in this soft or semi-soft condition inserting the metal or rigid goose neck so as to stretch the smaller opening in the goose neck, a head or flange on the larger end of the goose neck snapping into place in the rebate or groove. Upon cooling, the bell mouth will set or become rigid and the goose neck securely held therein.

I have illustrated in the accompanying drawings a preferred embodiment of my invention, in which:—

The figure is a sectional elevation of the composite horn after cooling.

Referring to this drawing, I have indicated at 1 a bell mouth horn of vulcanizable plastic material formed in any desired manner. This horn is provided at its smaller end 2 with an interior rebate or groove 3. A goose neck is shown at 4 made of metal, wood, or other non-elastic or plastic material in the ordinary manner, and its larger end 5 is of greater diameter than the opening in the bell mouth 1 at the point 6. The end 5 of the goose neck is provided with a head or flange 7 adapted to fit the rebate or groove 3.

In assembling, the bell mouth is taken from the vulcanizer while hot. In this condition it is soft or semi-soft. While soft, the rigid goose neck 4 is inserted through the larger end of the bell mouth, the end of 5 of the goose neck stretching or distorting the smaller end 2 of the bell mouth, until the head 7 snaps into place in the rebate 3. The assembled horn is then cooled in any desired manner. Such action causes the bell mouth to set rigid or shrink upon the goose neck and the two parts become as a unitary article.

I claim:

1. A method of assembling a plastic bell mouth and a rigid goose neck which includes the step of shrinking the bell mouth on the goose neck.

2. A method of assembling a horn which consists in treating a bell mouth so that it becomes plastic, distorting the smaller end thereof by forcing therein a rigid goose neck larger than the smaller end of the bell mouth and treating the bell mouth to cause it to rigidly set on said goose neck.

3. A method of assembling a horn which consists in forcing a larger goose neck into a smaller bell mouth opening and then treating the assembled articles to cause the two parts to grip each other.

4. A method of assembling a horn which consists in making a bell mouth plastic, stretching the smaller end thereof by forcing thereinto a rigid goose neck, and thereafter treating said bell mouth to make it rigid.

5. A method of assembling a horn which consists of removing a vulcanizable bell mouth from a mold while hot and plastic, forcing into the smaller end thereof a rigid goose neck larger than said end, and cooling the bell mouth to cause it to shrink upon the goose neck.

6. A composite horn comprising a vulcanized bell mouth and a non-vulcanized goose neck secured together, the larger end of the goose neck being of greater diameter than the smaller end of the bell mouth.

7. A composite horn comprising a vulcanized bell mouth having an interior rebate at its smaller end, and a non-vulcanized goose neck having an end larger than the diameter of the smallest opening in the bell mouth, seated in said rebate.

In testimony whereof, I affix my signature.

GEORGE W. BULLEY.